(12) United States Patent
Bouloy et al.

(10) Patent No.: US 8,430,332 B2
(45) Date of Patent: Apr. 30, 2013

(54) THERMOSTATIC VALVE WITH SLEEVE, THERMAL ENGINE ASSOCIATED WITH A COOLING CIRCUIT INCLUDING SUCH VALVE AND METHOD FOR MAKING THE SLEEVE FOR SUCH VALVE

(75) Inventors: Alain Bouloy, Etrechy (FR); Nicolas Pottie, Sainte Genevieve des Bois (FR); Thierry Maraux, Les Clayes Sous Bois (FR)

(73) Assignee: Vernet, Ollainville (FR)

( * ) Notice: Subject to any disclaimer, the term of this patent is extended or adjusted under 35 U.S.C. 154(b) by 673 days.

(21) Appl. No.: 12/452,989

(22) PCT Filed: Jul. 30, 2008

(86) PCT No.: PCT/FR2008/051438
§ 371 (c)(1),
(2), (4) Date: Feb. 1, 2010

(87) PCT Pub. No.: WO2009/019407
PCT Pub. Date: Feb. 12, 2009

(65) Prior Publication Data
US 2010/0132361 A1     Jun. 3, 2010

(30) Foreign Application Priority Data
Aug. 1, 2007   (FR) ...................................... 07 05630

(51) Int. Cl.
*G05D 23/02* (2006.01)
(52) U.S. Cl.
USPC ...... 236/93 A; 236/99 J; 236/100; 236/101 C
(58) Field of Classification Search ................ 236/93 R, 236/93 A, 99 R, 99 J, 100, 101 C
See application file for complete search history.

(56) References Cited

U.S. PATENT DOCUMENTS

| 3,658,243 | A | 4/1972 | Beatenbough et al. |
| 7,520,446 | B2 * | 4/2009 | Maraux et al. ................... 236/95 |
| 7,874,498 | B2 * | 1/2011 | Kempf et al. ............... 236/12.13 |
| 2002/0104892 | A1 * | 8/2002 | Suda ......................... 236/101 C |

FOREIGN PATENT DOCUMENTS

| FR | 2254717 | 7/1975 |
| FR | 2589219 | 4/1987 |
| FR | 2684424 A | 6/1993 |
| GB | 2261934 | 6/1993 |

* cited by examiner

*Primary Examiner* — Marc Norman
(74) *Attorney, Agent, or Firm* — Dowell & Dowell, PC

(57) ABSTRACT

According to the invention, the thermostatic valve (10) includes, on the one hand, a mobile sleeve (30) for adjusting the flow of fluid through the valve body (20), said sleeve comprising a tubular body (31) provided with peripheral sealing fittings (32, 33, 34) adapted for interaction by sealed contact with the fixed seats (25A, 26A, 27A) in order to stop the fluid flows between the openings (21, 22, 23) defined by the valve body and, on the other hand, a thermostatic member (40) including a fixed portion (42) rigidly connected to the valve body and a fixed portion (41) movable in translation in the direction of the axis (X-X) of the sleeve under the action of a volume variation of a thermo-expansible material, the sleeve being kinematically connected to the mobile portion so that the movement of the mobile portion relative to the fixed portion controls the movement of the sleeve relative to the seats. In order to easily and economically improve the tightness of the contact between the sleeve and the seats, the body and the sealing fittings are respectively made of a thermoplastic material and an elastomer that are selected to be successively injection-molded so that, at the release of the mold after the elastomer injection, the thermoplastic material and the elastomer adhere together due to a chemical, physical and/or physico-chemical effect.

10 Claims, 7 Drawing Sheets

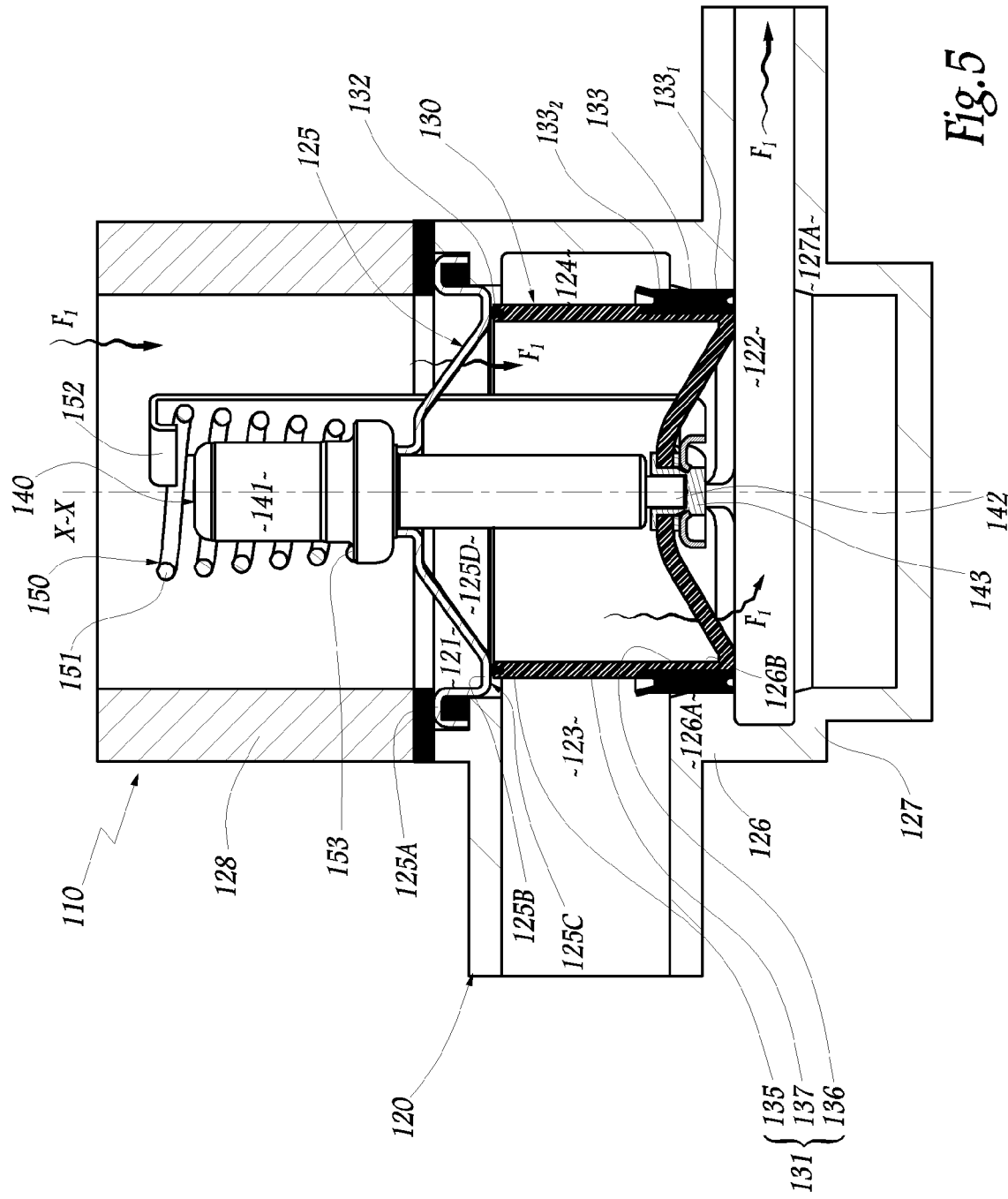

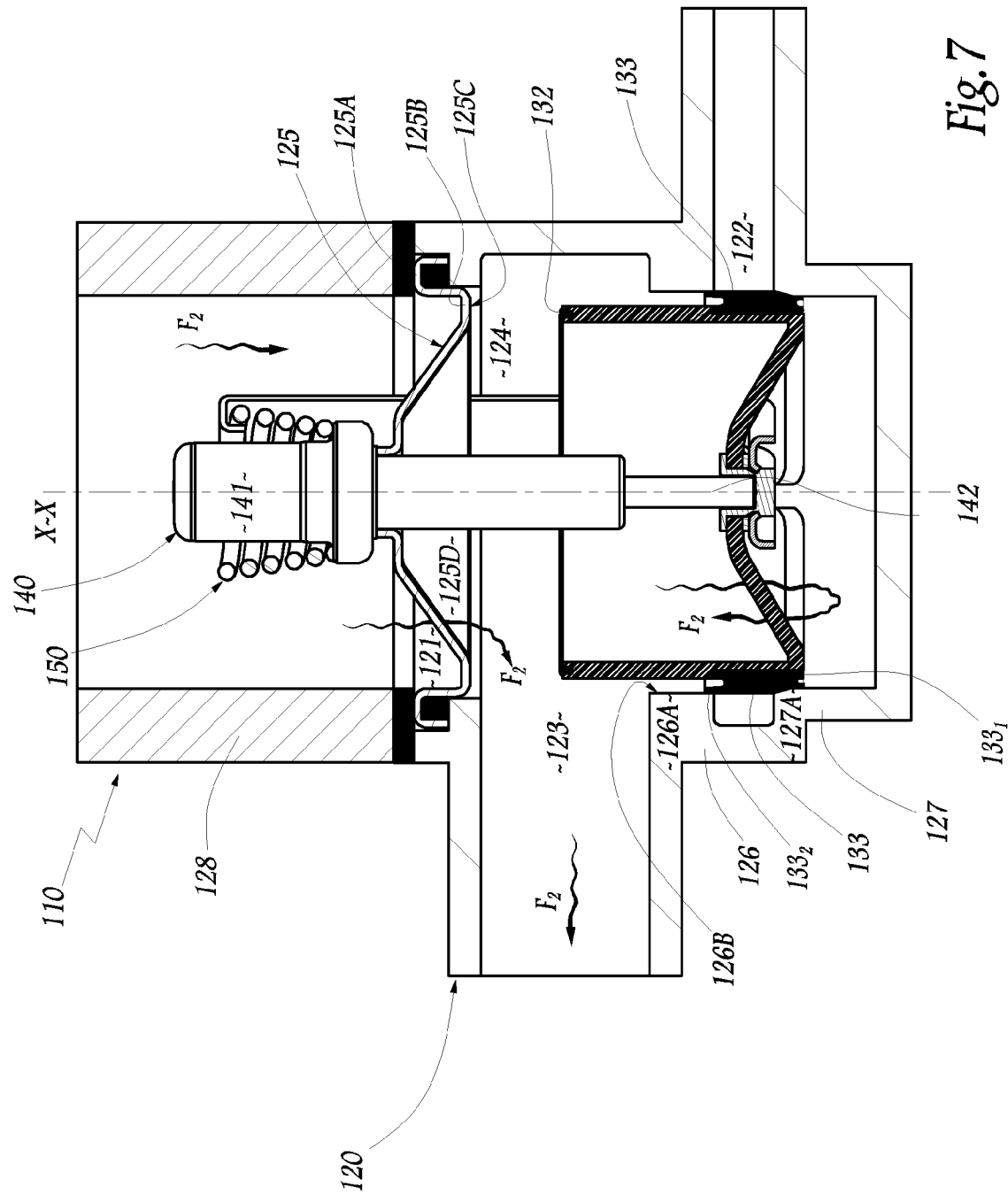

THERMOSTATIC VALVE WITH SLEEVE, THERMAL ENGINE ASSOCIATED WITH A COOLING CIRCUIT INCLUDING SUCH VALVE AND METHOD FOR MAKING THE SLEEVE FOR SUCH VALVE

The present invention relates to a thermostatic valve for a fluid circulation circuit, particularly of cooling fluid for a heat engine, and a heat engine associated with such a cooling fluid circulation circuit. The invention also relates to a method for manufacturing a sleeve for such a valve.

Valves provided with a regulating sleeve controlled in movement by a thermostatic element are typically fitted to cooling circuits associated with heat engines of high cubic capacity, particularly those used in trucks and certain motor vehicles, for which the flow rates of cooling fluid necessary for their operation are higher than those encountered for heat engines of smaller cubic capacities, for which the thermostatic valves used are gate valves.

Specifically, the use of a sleeve usually makes it possible to have a stopper that is called balanced, that is to say a stopper for which the difference in pressures prevailing on either side of the wall of the sleeve is substantially zero in the direction of movement of the sleeve by the thermostatic element, this direction corresponding in practice to the axial direction of the sleeve. In contrast, in a thermostatic valve with a gate, the latter extends in a plane perpendicular to the direction of movement of the gate by the thermostatic element, so that the pressure difference prevailing on either side of the gate in this direction reaches high values, particularly when the circulation of fluid is interrupted by the gate. The energy necessary to separate such a gate from its seat is then often considerable and is all the more so if the flow rate of fluid to be regulated is considerable and comes in the direction of closure of the gate.

In practice, within a thermostatic valve, the regulating sleeve has a metal nature and is used jointly with one or more seats against which the sleeve is pressed depending on its positions in the valve body. These seats are fixed relative to the valve body, consisting either of parts fixedly attached inside the valve body, or by portions of wall of this valve body. In all cases, a flow of fluid can then be regulated by the relative distance between the sleeve and the seat or one of these seats, this flow being in principle cut off when the sleeve is pressed against the seat. However, in practice, the sleeve/seat contact allows leakages to pass, because of the dimensioning tolerances of the valve body and the metal nature of the sleeve, in particular when the sleeve/seat contact is a metal/metal contact. To reinforce the seal of the contact between the sleeve and the seat in order to limit these leakages, it is known practice either to grind in the surface zones of the sleeve and of the seat that come into contact, or to overmould the seat with rubber. However, such a grinding in and such an overmoulding are costly operations and are often difficult to make compatible, from a technical point of view, with the environment of the seat, particularly according to the integration of the regulating sleeve in valve bodies with specific geometries. In these conditions, the leakages in the sleeve/seat contacts are very often tolerated as they are.

U.S. Pat. No. 3,658,243 proposes a thermostatic valve of which the tubular body of the sleeve is made of a plastic material having the specific feature of being able, at one of the axial ends of the body, to be pushed back to retain a seal previously fitted around this end. In practice, the manufacture of this sleeve is complex and awkward: the pushing-back operation requires an elaborate apparatus and runs the risk either of damaging or of incorrectly fastening the seal and therefore of limiting the performance of this seal in terms of tightness.

The object of the present invention is to propose a sleeved thermostatic valve, the sealing of which is enhanced at the contact between the sleeve and its bearing seat or seats, while being economical and easy to manufacture.

Accordingly, the subject of the invention is a thermostatic valve for a fluid circulation circuit, notably a cooling fluid circuit for a heat engine.

The basic idea of the invention is to "replace" the sleeves, notably the metal sleeves of the prior art with a sleeve consisting essentially, or even exclusively, of two plastic materials. Therefore, according to the invention, the main tubular body of the sleeve consists of a thermoplastic material, if necessary laden with reinforcing fibres, this thermoplastic material having the advantage of being economical. Moreover, an elastomer is used in order to form one or more peripheral seals, directly on the body of the sleeve. Such an elastomer has the advantage of being flexible and thus of arranging a deformable zone of contact with the fixed seat or one of the fixed seats of the valve. Compared with a metal sleeve from the prior art, the sleeve according to the invention establishes with its or each of its seats a significantly more sealed contact.

The plastic bi-material nature of the sleeve according to the invention is easy and economical to manufacture. This is because, by choosing a thermoplastic material and an elastomer that can be injected, these two plastic materials can be successively injected in order respectively to mould the body and the seal or seals of the sleeve. In practice, the two injections are advantageously carried out in one and the same mould by one and the same injection machine. Moreover, by virtue of the adhesion of the elastomer to the thermoplastic material, the interface between the body and the or each seal of the sleeve has a particularly high level of strength without making use of costly and complicated structural arrangements, such as fitting additional assembly parts or working the body of the sleeve after it has been moulded.

By choosing a thermoplastic material and an elastomer withstanding the nature of the regulated fluid and the operating temperature range of the valve, the fact that the sleeve consists of plastic materials does not limit the longevity of the valve: on the one hand, as explained above, the sleeve is used as a balanced stopper, which limits the mechanical stresses applied to it in service, and, on the other hand, the geometric shape of the sleeve body can be easily designed to withstand these mechanical stresses as well as possible, the thickness of its wall being able to be locally increased if necessary.

Other advantageous features of the valve according to the invention, taken in isolation or in all technically possible combinations are set forth within the specification and in the claims.

A further subject of the invention is a heat engine associated with a circuit for the circulation of a fluid for cooling the engine, as defined in Claim 7. By virtue of the good seal between the sleeve and the seat or seats within the valve, the engine according to the invention has remarkable operating performance while being particularly economical to manufacture with respect to the valve of its cooling circuit. According to an advantageous embodiment, the valve body consists at least partially of a portion of the cylinder head of the engine.

A further subject of the invention is a method for manufacturing a sleeve for a valve as defined above, which method is as defined in Claim 8. This method makes it possible to obtain economically and rapidly the sleeve ready to be assembled to the other components of the valve.

Arrangements that are particularly advantageous from an economical and practical point of view are set forth in the claims.

The invention will be better understood on reading the following description given only as an example and made with reference to the drawings in which:

FIGS. 5 to 8 are views respectively similar to FIGS. 1 to 4, illustrating a second embodiment of the valve according to the invention.

Figure 1:
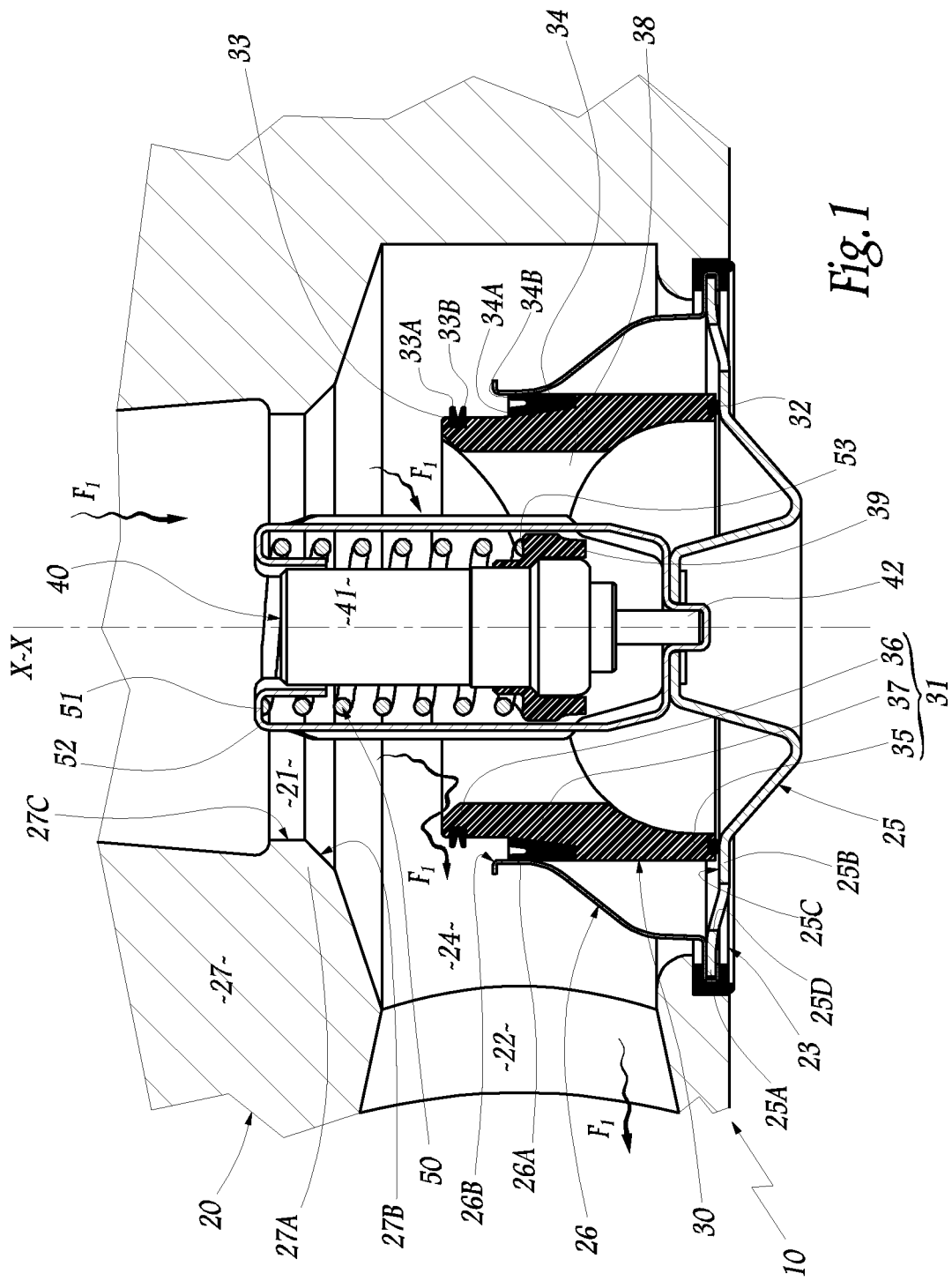
FIGS. 1 to 3 are longitudinal sections of a first embodiment of a valve according to the invention, these figures illustrating respectively three different operating configurations of the valve.
Figure 2:
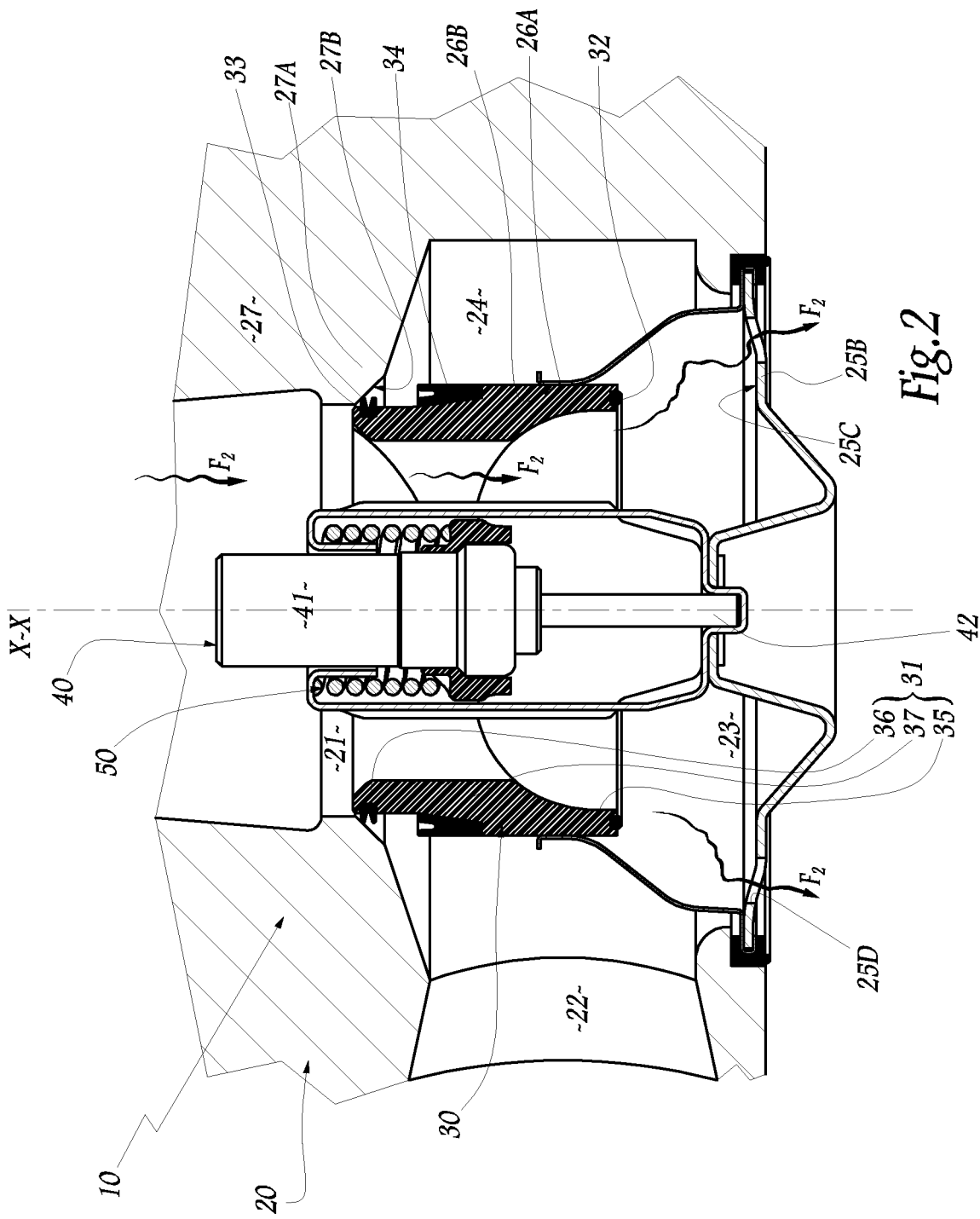
Figure 3:
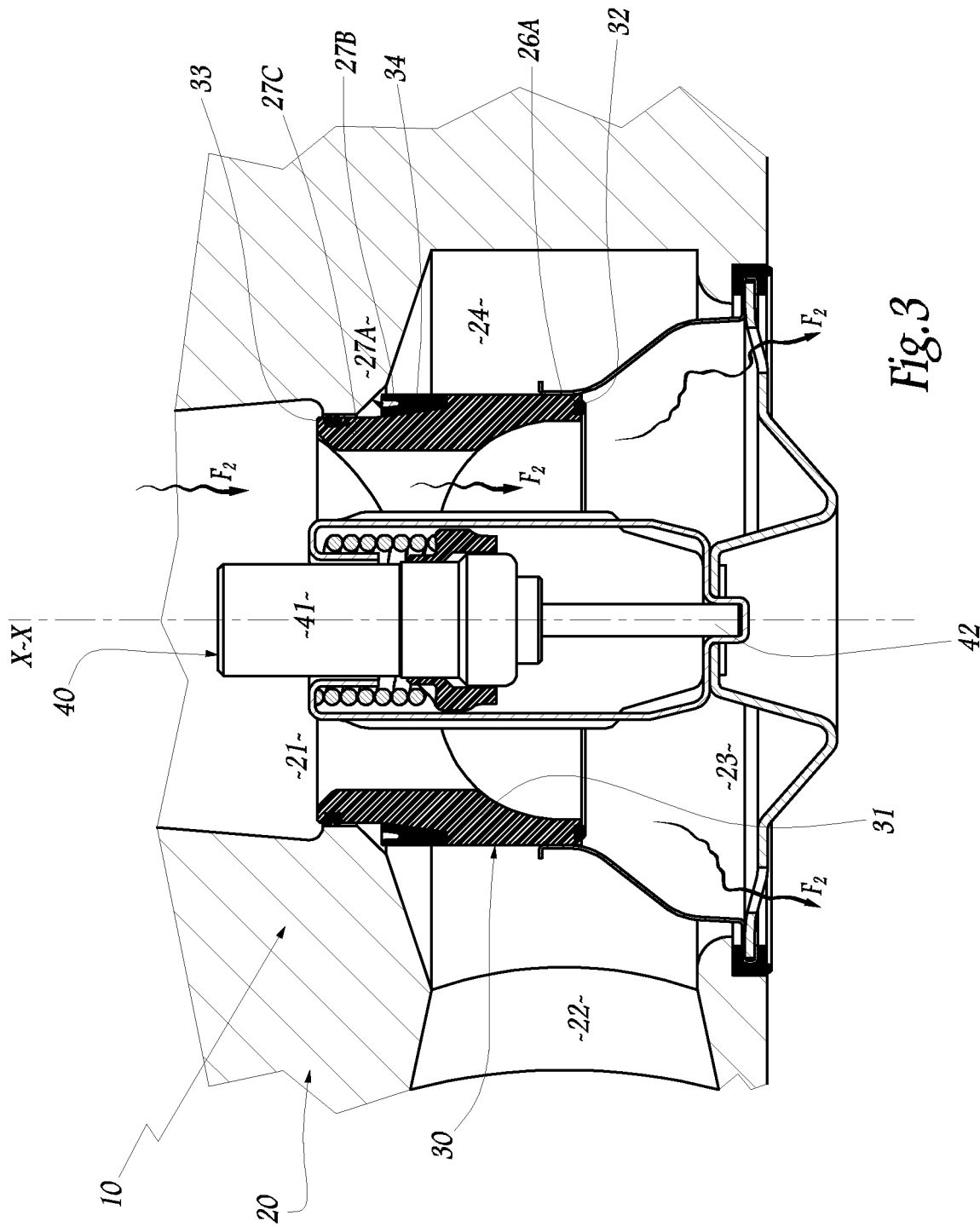

FIGS. 1 to 3 show a valve 10 suitable for regulating the circulation of a fluid entering the body 20 of the valve through an orifice 21 and leaving this body through one and/or the other of orifices 22 and 23 after having traversed a regulating chamber 24 into which, on the one hand, the orifices 21, 22 and 23 open and, on the other hand, a movable sleeve 30 and a thermostatic element 40 for controlling the movement of this sleeve are arranged. The valve 10 is for example used in a cooling circuit of a truck engine: the cooling liquid, which circulates in this circuit under the action of a drive pump, is sent from the engine to the orifice 21 in order to supply the valve which, depending on the temperature of the fluid as explained in detail below, regulates this entering fluid by sending some or all of it to the orifice 22 connected to a channel for direct return to the engine, commonly called the bypass channel, and/or to the orifice 23 connected to a channel which, before returning to the engine, passes through a heat exchanger, such as a radiator, which cools the liquid.

Here, the valve body 20 consists of the cylinder head of the aforementioned engine, it being understood that the orifice 23, which, on one side opens into the chamber 24, opens on the opposite side into a fitted duct, not shown, assembled fixedly to the valve body.

The sleeve 30 has a generally tubular shape, centred on a longitudinal axis X-X. It is arranged in the chamber 24 so that the outlets into the chamber of the orifices 21 and 23 are generally centred on the axis X-X, while the orifice 22 opens into the chamber 24 in a manner that is radial to this axis.

Figure 4:
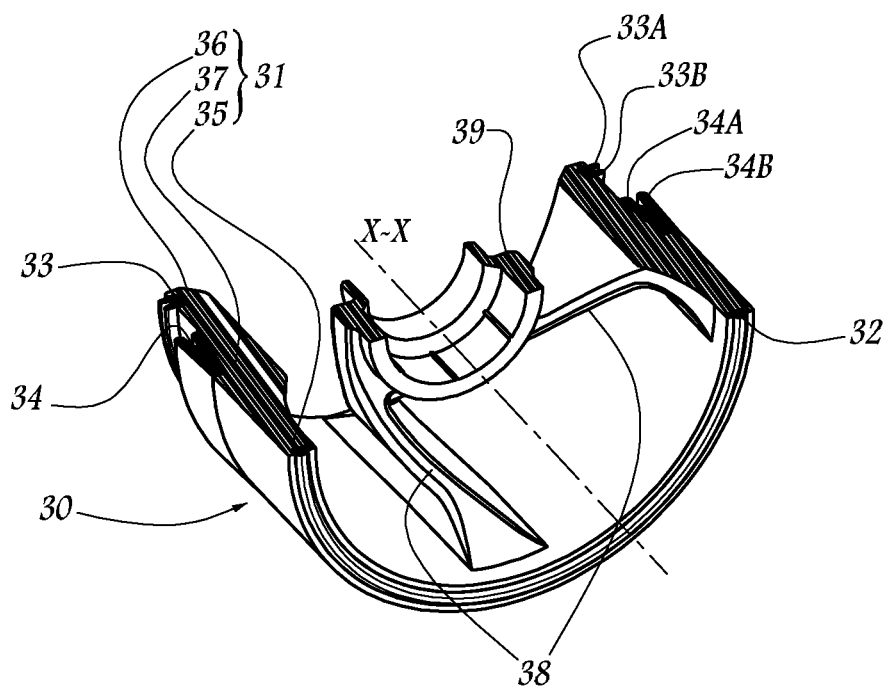
FIG. 4 is a view in perspective of a longitudinal half-section of the sleeve belonging to the valve of FIGS. 1 to 3.

As can be clearly seen in FIG. 4, the sleeve 30 comprises a main one-piece body 31 that is essentially tubular, centred on the axis X-X and having a solid wall over the whole of its periphery. The sleeve also comprises three seals 32, 33 and 34 each extending over the whole periphery of its body 31.

The seal 32 is arranged at an axial end 35 of the body 31, which is turned toward the orifice 23 in the assembled configuration of the valve 10. More precisely, the seal 32 is housed in a matching recess delimited by the sleeve end 35 so that a portion of the seal protrudes, along the axis X-X, from the edge of the end 35.

The seal 33 is arranged at the other end 36 of the sleeve 30. This seal is also housed in a matching recess delimited by the end 36, but, unlike the seal 32, a portion of the seal 33 extends protruding at the outside of this recess in a direction radial to the axis X-X, to the outside of the body 31. Moreover, unlike the seal 32, the protruding portion of which has, in cross section, an essentially convex profile, the protruding portion of the seal 33 has, in cross section, a V-shaped profile oriented perpendicularly to the axis X-X, so that this protruding portion of seal forms two sealing lips 33A and 33B which each extend lengthwise in a direction peripheral to the axis X-X, in a centred manner to this axis, and which are placed one above the other in the direction of this axis.

The seal 34 is arranged at the unsupported portion 37 of the body 31, surrounding a part of this unsupported portion. This part is connected to the rest of the unsupported portion 37 while forming, on the side of the end 35, an outer shoulder, against which an axial end of the seal 34 is placed. At its opposite axial end, the seal 34 has, in cross section, a V-shaped profile oriented in the direction of the axis X-X, so that this end of the seal forms two sealing lips 34A and 34B which each extend in a direction peripheral to the axis X-X, while being centred on this axis, and which are placed one inside the other in a direction radial to the axis X-X.

The body 31 consists of a thermoplastic material, such as polyamide, optionally reinforced with fibres, such as glass fibres. The seals 32, 33 and 34 are, for their part, made of an elastomer, preferably of silicone.

In practice, the thermoplastic material forming the body 31 and the elastomer forming the seals 32, 33 and 34 are chosen:
  to withstand undamaged the nature of the fluid regulated by the valve 10, and the operating temperature range of the valve,
  to be injection moulded, and
  to adhere to one another by a chemical, physical and/or physico-chemical effect, so that the seals 32, 33 and 34 are naturally firmly connected to the body 31, without using any additional arrangements, particularly without fitting additional assembly parts.

Therefore, in order to manufacture the sleeve 30, the thermoplastic material and the elastomer are successively injected into a mould in order to form respectively the body 31 and the seals 32, 33 and 34. In practice, in order to obtain from a single mould the sleeve ready to be assembled to the other components of the valve 10, one and the same injection machine comprises one unit for injecting the thermoplastic material and a separate unit for injecting the elastomer, these two units being actuated successively. As a variant, two separate injection machines may be used in succession, but this lengthens the manufacture of the sleeve.

In all cases, on removal from the mould after injection of the elastomer, no additional resurfacing or overmoulding operation needs to be applied to give the sleeve 30 its sealing characteristics with respect to the valve body 20.

As indicated above, the thermostatic element 40 controls the movements of the sleeve 30 relative to the valve body 20, inside the regulating chamber 24. Accordingly, this thermostatic element comprises, on the one hand, a heat-conducting dish 41 containing a heat-expandable material, such as a wax, and a rod 42 capable of being deployed and of retracting, by translation in the longitudinal direction of the rod, with respect to the inside of the dish 41 under the effect of a variation in volume of the heat-expandable material.

The thermostatic element 40 is arranged in the chamber 24 so that its rod 42 occupies a position that is fixed relative to the valve body 20, while being designed to be resting fixedly against a fixed stamped metal sheet 25 placed across the orifice 23. The metal sheet 25 is generally centred on the axis X-X and occupies the whole of the orifice 23. It includes an outer peripheral edge 25A fixedly secured to the wall of the valve body 20, which delimits the orifice 23.

The rod 42 being fixedly resting against the central zone of the metal sheet 25, the dish 41 extends lengthwise in the chamber 24 while being generally centred on the axis X-X of the sleeve 30, this dish and this sleeve being secured to one another by transverse branches 38 made of the same material and in one piece with the body 31 and connecting the inner face of this body to the dish 41. As can be seen in FIG. 4, the branches 38 are evenly distributed about the axis X-X, while delimiting between them free spaces allowing the circulation of fluid in the direction of the axis X-X. Since the rod 42 occupies a position that is fixed relative to the valve body 20, it can be understood that, when there is a variation of volume in the heat-expandable material contained in the dish 41, this dish moves in translation along the axis X-X relative to the valve body, while pulling the sleeve 30 in an identical translation movement.

The valve 10 also comprises a return spring 50 for returning the dish 41 toward the rod 42. Advantageously, this spring 50 forms a spiral centred on the axis X-X and surrounding the dish 41 so that one end 51 of the spring rests on the branches of a rigid yoke 52 secured to the rod 42, while the opposite end 53 of the spring rests on a shouldered portion of the dish 41, with interposition of a ring 39 made of thermoplastic material which connects together the inner ends of the branches 38, while being made of the same material and in one piece with these branches. The mechanical stresses applied by the spring 50 to the ring 39 are mainly absorbed by the shouldered portion of the dish 41, which limits the mechanical stress of the ring and thereby its risk of breakage.

In operation, the deployment and retraction of the rod in the dish 41 depend on the temperature of the fluid supplying the orifice 21: when the temperature of this fluid increases, the valve occupies successively three configurations illustrated respectively in FIGS. 1, 2 and 3.

In FIG. 1, the temperature of the fluid entering the chamber 24 via the orifice 21 is lower than the temperature for activating the thermostatic element 40, so that the rod 42 is essentially retracted inside the dish 41. The sleeve 30 then closes the orifice 23 in a sealed manner by interaction with the metal sheet 25. More precisely, the end 35 of the body 31 is pressed against an intermediate peripheral portion of the metal sheet 25, which forms a bearing seat 25B for this sleeve end 35. The seal 32 is then pressed by the body 31 against a corresponding surface 25C which the seat 25B delimits in a plane perpendicular to the axis X-X. Since the protruding portion of the seal 32 extends in the axial extension of the body 31, this seal is effectively compressed in the direction of the axis X-X between the body 31 and the seat 25B, which, in a sealed manner, cuts off the flow of fluid between the sleeve and this seat. In particular, the fluid originating from the orifice 21 and allowed into the sleeve 30 while flowing between the branches 38, is prevented from crossing the seat 25B in order to reach through-openings 25D delimited by the metal sheet 25 between its portion forming the seat 25B and its outer edge 25A.

Still in the configuration of the valve 10 illustrated in FIG. 1, the fluid entering the valve is also prevented from reaching the openings 25D by travelling externally round the sleeve 30 thanks to the seal 34. To do this, this seal 34 is pressed, radially to the axis X-X, against a seat 26A formed by a throttled axial end of a tubular collar 26 with a solid wall over the whole of its periphery, arranged fixedly in the chamber 24 in a manner centred on the axis X-X, while in particular being secured to the valve body 20 at its opposite axial end. The seat 26A delimits an inner surface 26B that is substantially cylindrical and centred on the axis X-X, against which the seal 34 is pressed, in a direction radial to the axis X-X, by the sleeve body 31. Advantageously, via an effect of elasticity of the elastomer forming the seal 34, the lips 34A and 34B tend normally to separate from one another in a direction radial to the axis X-X, which reinforces the seal of the contact of the seal 34 with the surface 26B.

Therefore, in the configuration of the valve 10 illustrated in FIG. 1, all the fluid allowed into the chamber 24 through the orifice 21 leaves this chamber via the orifice 22, as indicated by the arrows $F_1$, while the openings 25D, which form the only passageways that are open for the fluid at the orifice 23, are isolated in a sealed manner from the chamber 24 by the seals 32 and 34. Therefore, if the valve 10 is used in a cooling circuit described above, all the cooling liquid originating from the engine is returned to the engine via the bypass channel, the channel of the circuit passing through the radiator not being supplied.

When the temperature of the fluid supplying the orifice increases, the rod 42 is deployed relative to the dish 41, which pulls the latter and the sleeve 30 secured to the latter in translation along the axis X-X in the direction of the orifice 21, until the valve 10 is in the configuration illustrated in FIG. 2.

In this configuration, the end 35 of the sleeve 30 is separated axially from the seat 25B, so that the fluid allowed into the sleeve 30 through the branches 38 leaves the valve 10 through the orifice 23, via the openings 25D, as indicated by the arrows $F_2$. At the same time, the fluid entering the chamber 24 is prevented from reaching the orifice 22 by the seal 33: the translated position of the sleeve 30 is such that the end 36 of the sleeve extends through the orifice 21 so that the seal 33 is pressed against the wall 27 of the body 20 delimiting the orifice 21, this wall thus forming a bearing seat 27A for the sleeve end 36. This wall forming the seat 27A delimits, on its side turned toward the chamber 24, a frustoconical surface 27B, centred on the axis X-X and converging in the direction opposite to the chamber 24. The seal 33 is therefore pressed in a sealed manner against this surface 27B, it being noted that, advantageously, by an effect of elasticity of the elastomer forming this seal, tending to separate the lips 33A and 33B from one another, the lip 33A opposite to the chamber 24 is effectively pressed against the surface 27B.

During the translation of the sleeve 30 when the valve changes from its configuration in FIG. 1 to that in FIG. 2, the seal 34 slides against the bearing surface 26B of the seat 26A, until, if necessary, being disengaged from this seat, to the benefit, directly, of the outer face of the unsupported portion 37 of the sleeve, which can allow leakages of fluid that are acceptable to pass into the orifice 22. Therefore, with respect to the cooling circuit fitted with the valve 10, the supply of the bypass channel reduces greatly to the benefit of that of the channel passing through the radiator, for the purpose of cooling the heated cooling liquid.

If the temperature of the fluid supplying the orifice 21 continues to increase, the deployment of the rod 42 relative to the dish 41 continues on an overtravel, that is to say on an additional movement to that necessary and sufficient to pull the sleeve 30, from a position separated from the seat 27A, in which fluid can circulate between the sleeve and this seat, to the position pressed against this seat, illustrated in FIG. 2, in which the flow rate of fluid circulating between the sleeve and the seat becomes zero. The sleeve 30 thus being translated also on this overtravel, its end 36 is then engaged in the seat 27A, as shown in FIG. 3. This engagement is possible by deformation of the seal 33 against the frustoconical surface 27B, the latter inducing a centring effect of the end of the sleeve 36 inside the seat 27A. On the opposite side to the chamber 34, the frustoconical surface 27B is in this instance extended by a cylindrical surface 27C centred on the axis X-X, so as not to radially deform the seal 33 beyond its elastic capacities.

In practice, it is understood that the seat 27A and the seal 33 are dimensioned relative to one another, in the direction of the axis X-X, in order to maintain a sealed contact over the whole of the overtravel. In this instance, since the seal 33 is much smaller, along the axis X-X, than the seat 27A, the dimension of the latter is designed to be at least equal to the value of the overtravel, with a safety margin.

By virtue of this arrangement, no mechanical return system of the overtravel needs to be incorporated into the valve 10, limiting the number of components of this valve and reducing its assembly time.

Figure 6:
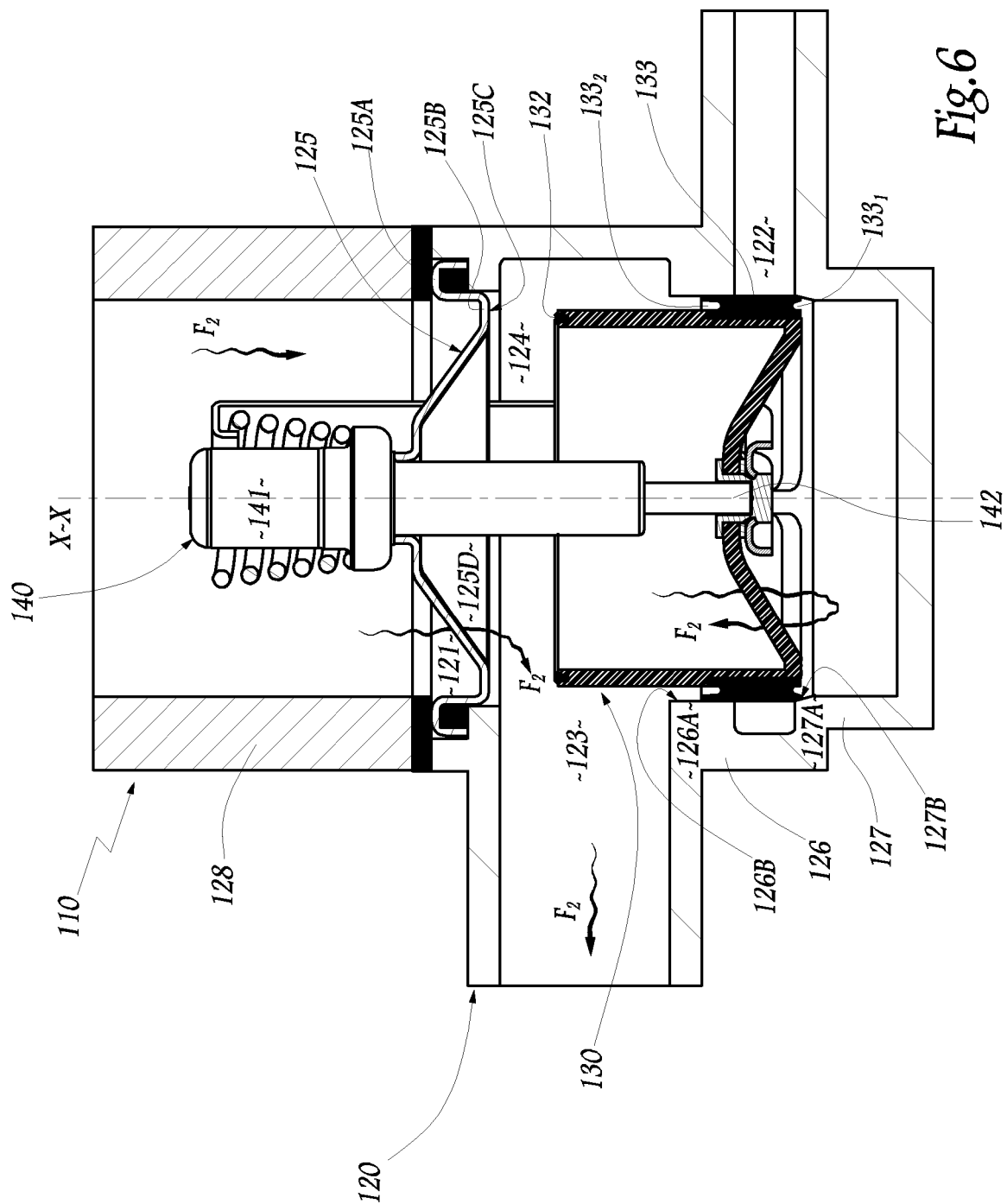

Represented in FIGS. 5 to 7 is a valve 110 corresponding to an alternative embodiment to that of the valve 10 in FIGS. 1 to 3. The valve 110 may in particular be used in the same cooling circuit of a truck engine as that envisaged for the valve 10. Accordingly, the valve 110 is suitable for regulating the circulation of a fluid entering the body 120 of the valve via an orifice 121 and leaving this body via one and/or the other of the orifices 122 and 123, after having traversed a regulating chamber 124 in which a movable sleeve 130 and a thermostatic element 140 are arranged capable of translating the sleeve in the direction of the central longitudinal axis X-X of this sleeve. In the example considered in the figures, the orifice 121 opens, on its side opposite to the chamber 124, into a duct 128 fixedly assembled to the valve body 120, with interposition of a flat seal.

Figure 8:
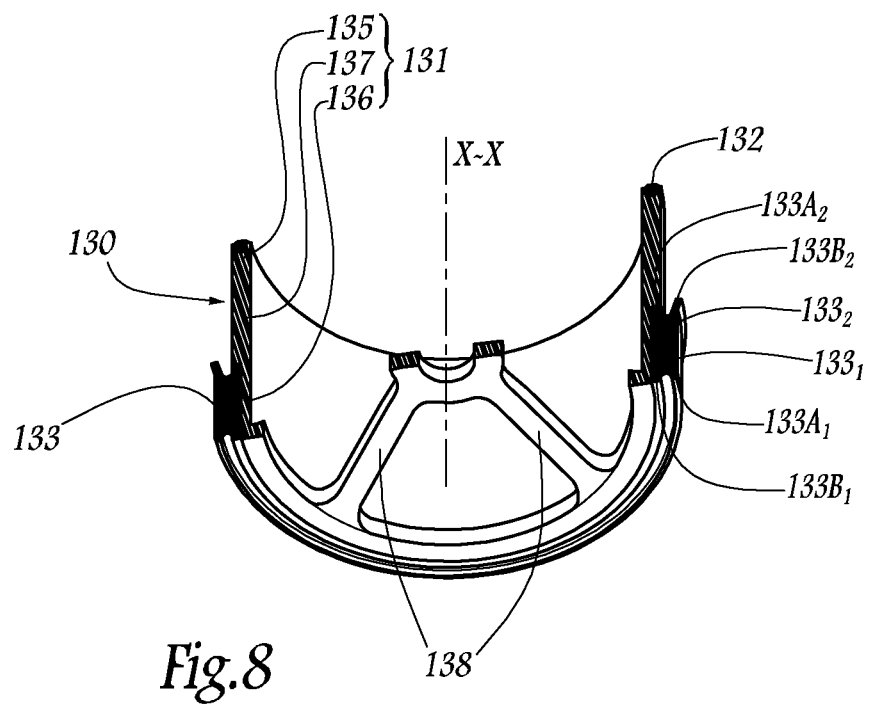

In a manner similar to the sleeve 30 and as can be clearly seen in FIG. 8, the sleeve 130 comprises a main one-piece body 131 that is essentially tubular, centred on the axis X-X and having a solid wall over the whole of its periphery. This body 131 is provided with two peripheral seals 132 and 133.

The seal 132 is structurally and functionally similar to the seal 32, while being arranged at an axial end 135 of the body 131 turned toward the orifice 121 in the assembled configuration of the valve 110.

The seal 133 corresponds, in a way, to the combination of the seals 33 and 34 of the sleeve 30. More precisely, this seal 133 is arranged about the body 131, while extending along the axis X-X from the end 136, opposite to the end 135, of the body 131 to an intermediate portion of the unsupported part 137 of this body. The seal 133 therefore comprises, on the one hand, an axial end portion $133_1$, arranged at the sleeve end 136, and, on the other hand, an opposite axial end portion $133_2$, arranged at the unsupported portion 137. The seal 133, particularly the end portions $133_1$ and $133_2$, extends in radial protrusion toward the outside of the body 131. Advantageously, the end portions $133_1$ and $133_2$ have, in cross section, respective V-shaped profiles oriented in the direction of the axis X-X, opposite to one another, so that each of these end portions $133_1$, $133_2$ form two sealing lips $133A_1$ and $133B_1$, $133A_2$ and $133B_2$, which are substantially similar, from a structural and functional point of view, to the lips 34A and 34B of the seal 34.

As described in detail above for the sleeve 30, the body 131 and the seals 132 and 133 of the sleeve 130 are respectively made of a thermoplastic material and an elastomer, these two plastic materials having the same characteristics of use and of manufacture as those developed above with respect to the sleeve 30.

Unlike the sleeve 30 kinematically linked to the dish of the thermostatic element 40, the sleeve 130 is secured to the rod 142 of the thermostatic element 140, the inner face of the body 131 being connected, via transverse branches 138 made of the same material and in one piece with the body 131, to a metal endpiece 143 secured to the free end of the rod 142, particularly by force-fitting. To allow the sleeve to be pulled in translation by the rod 142, the latter is designed to be movable relative to the valve body 120, while the dish 141 of the thermostatic element 140 is connected in a fixed manner to the valve body, in this instance by a stamped metal sheet 125, punched in its centre in order to force-fit the dish 141 thereon, while its outer peripheral edge 125A is firmly trapped between the valve body and the duct 128. The rod 142 is designed to be returned to the dish 141 by a spring 150 surrounding the dish 141 and resting, at its end 151, on the branches of a rigid yoke 152 secured to the endpiece 143, while the opposite end 153 of the spring rests directly on a shouldered portion of the dish 141.

The operation of the valve 110 is substantially similar to that of the valve 10, as explained below.

In FIG. 5, which corresponds to an operating configuration similar to that illustrated in FIG. 1 for the valve 10, the temperature of the fluid entering the chamber 124 via the orifice 121 is lower than the temperature for activating the thermostatic element 140. The sleeve 130 then closes the orifice 121 in a sealed manner, by interaction with the metal sheet 125: the sleeve end 135 is specifically pressed against an intermediate peripheral portion of the metal sheet 125, which forms a bearing seat 125B for this end of the sleeve. The seal 132 is then pressed by the body 131 against the surface 125C which the seat 125D delimits in a plane perpendicular to the axis X-X, in a manner similar to the pressure bearing of the seal 32 against the surface 25C. The fluid originating from the orifice 121 and allowed into the sleeve 130, at its end 135, after having traversed openings 125D delimited by the inner peripheral portion of the metal sheet 125, is prevented from reaching the orifice 123 by crossing the seat 125B. The fluid is also prevented from reaching the orifice 123 by travelling externally around the sleeve 130 after having internally traversed it, by virtue of the seal 133. To do this, this seal 133 is pressed, radially to the axis X-X, against a seat 126A formed by a wall 126 of the valve body 120, situated between the orifices 122 and 123 along the axis X-X. This seat 126A accordingly delimits a substantially cylindrical inner surface 126B centred on the axis X-X, against which the seal 133 is pressed radially to the axis X-X by the sleeve body 131. The circulation of the fluid is indicated by the arrows $F_1$.

When the temperature of the fluid supplying the orifice 121 increases, the rod 142 is deployed relative to the dish 141, which pulls the sleeve 130 in translation along the axis X-X in the direction of the orifice 122, until the valve 110 is in the configuration illustrated in FIG. 6, this configuration corresponding to that illustrated in FIG. 2 for the valve 10. In this configuration, the end of the sleeve 135 is separated axially from the seat 125B, so that the fluid entering the valve leaves it via the orifice 123, as indicated by the arrows $F_2$. At the same time, the entering fluid is prevented from reaching the orifice 122 by the seal 133: the translated position of the sleeve 130 is such that the sleeve end 136 is engaged in sealed contact against a bearing surface 127B delimited by a seat 127A formed by a wall 127 of the valve body 120, axially opposite to the orifice 121. This surface 127B is frustoconical centred on the axis X-X and convergent in the direction opposite to the chamber 124. The end portion $133_1$ of the seal 133 then behaves like the seal with respect to the seat 27A, while, during the translation of the sleeve 130 when the valve passes from its configuration in FIG. 5 to its configuration in FIG. 6, the end portion $133_2$ behaves like the seal 34, by sliding in a sealed manner against the bearing surface 126B of the seat 126A.

If the temperature of the fluid entering the valve continues to increase, the deployment of the rod 142 continues on an overtravel. The end of the sleeve 136 is then engaged in the seat 127A, as shown in FIG. 7, which corresponds to an operating configuration similar to that illustrated in FIG. 3 for the valve 10.

Different arrangements and variants to the valves 10 and 110 described above can moreover be envisaged. As examples:

- the geometric shapes of the seals 32, 33, 34, 132 and 133 are for illustration only; in particular, the conformation of the ends of certain of these seals into sealing lips is only one possibility, other shapes being able to be envisaged; and/or
- the valves 10 and 110 may be used in cooling circuits with directions of flow that are the reverse of those described hitherto, that is to say with two fluid inlets, through the orifices 22 and 23, 122 and 123, and only one fluid outlet, through the orifice 21, 121; in this case, the bypass channel is connected to the orifice 23, 123 while the orifice 22, 122 is connected to the outlet of the radiator supplied directly by the discharge from the engine and the orifice 21, 121 discharges the fluid to the engine.

The invention claimed is:

1. A thermostatic valve for a fluid circulation circuit, comprising:
    a valve body delimiting orifices for the inlet and outlet of a fluid circulating through the valve body,
    a sleeve for regulating the circulation of the fluid through the valve body, wherein the sleeve defines a central longitudinal axis, wherein the sleeve can be moved relative to the valve body and wherein the sleeve includes a tubular body provided with at least one peripheral seal suitable for interacting by sealed contact with at least one seat that is fixed relative to the valve body in order to cut off a flow of fluid between two of the orifices, and
    a thermostatic element containing a heat-expandable material and including a fixed portion fixed to the valve body and a movable portion that can be moved in translation relative to the fixed portion in the direction of the central longitudinal axis of the sleeve under the effect of a variation of volume of the heat-expandable material,
    the sleeve being kinematically connected to the movable portion so that the movement of the movable portion relative to the fixed portion in the direction of the central longitudinal axis of the sleeve controls the movement of the sleeve relative to the at least one seat, wherein the body of the sleeve and the seal of the sleeve are respectively made of a thermoplastic material and an elastomer which are chosen to be successively injection molded in a mold so that, on leaving the mold after injection of the elastomer, the thermoplastic material and the elastomer adhere to one another by a chemical, physical or physico-chemical effect.

2. The valve according to claim 1, wherein the elastomer forming the at least one seal is silicone.

3. The valve according to claim 1, wherein the at least one seal is arranged at a first axial end of the body of the sleeve in order to be pressed, by the body of the sleeve when it is moved, against a bearing surface delimited by the at least one seat and extending in a plane substantially perpendicular to the central longitudinal axis of the sleeve.

4. The valve according to claim 1, wherein the at least one seal is arranged at least partially around an unsupported portion of the body of the sleeve in order to slide, through pulling by the body of the sleeve during its movement, in sealed contact against a bearing surface delimited by the at least one seat and having a substantially cylindrical shape centered on the central longitudinal axis of the sleeve.

5. The valve according to claim 1, wherein the at least one seal is arranged at a second axial end of the body of the sleeve in order to be engaged, through pulling by the body of the sleeve during its movement, in sealed contact against a bearing surface delimited by the at least one seat and having at least partially frustoconical shape, centered on the central longitudinal axis of the sleeve and converging on an opposite side from the rest of the body of the sleeve.

6. The valve according to claim 5, wherein the bearing surface delimited by the at least one seat and the at least one seal are dimensioned relatively, in the direction of the central longitudinal axis of the sleeve, in order to maintain between them a sealed contact during the pulling of the body of the sleeve over an overtravel of the movable portion of the thermostatic element, with respect to a necessary and sufficient travel of the movable portion in order to pull the sleeve relative to the at least one seat so as to cause the flow rate of fluid circulating between the sleeve and the at least one seat to change from a positive value to a zero value.

7. A heat engine associated with a circuit for the circulation of a fluid for cooling the engine, which circuit comprises means for carrying the fluid, a heat-exchange radiator capable of cooling the fluid, and a valve according to claim 1, and means for connection between the valve and the heat engine, suitable, depending on the position of the regulating sleeve, to send at least a portion of the cooling fluid to the engine after the cooling fluid has passed through the heat-exchange radiator.

8. Method for manufacturing the sleeve for a valve according to claim 1, wherein the thermoplastic material is injected into a mold in order to mold the body of the sleeve, and then the elastomer is injected along a periphery of the body in order to mold the at least one seal so that, on leaving the mold, the elastomer adheres to the thermoplastic material.

9. The method according to claim 8, wherein the injection of the thermoplastic material and the injection of the elastomer are carried out in the same mold, on removal from the mold, the sleeve is ready to be assembled to other components of the valve.

10. The method according to claim 8, wherein, on leaving the mold after injection of the elastomer, no additional resurfacing, overmolding or assembly of fitted parts is used to obtain the sleeve which is ready to be assembled to other components of the valve.

* * * * *